F. HENRIKSEN.
LAWN MOWER.
APPLICATION FILED APR. 30, 1917.

1,251,022.

Patented Dec. 25, 1917.

Frode Henriksen, Inventor
By his Attorney
Ivan E. A. Konigsberg

UNITED STATES PATENT OFFICE.

FRODE HENRIKSEN, OF MORRISTOWN, NEW JERSEY.

LAWN-MOWER.

1,251,022.  Specification of Letters Patent.  Patented Dec. 25, 1917.

Application filed April 30, 1917. Serial No. 165,454.

*To all whom it may concern:*

Be it known that I, FRODE HENRIKSEN, a citizen of the Danish Monarchy, and resident of Morristown, in the county of Morris and State of New Jersey, have invented certain new and useful Improvements in Lawn-Mowers, of which the following is a specification.

This invention relates to improvements in lawn mowers and the object of the invention is to provide a lawn mower of generally improved construction and design specially adapted for cutting grass beds or edges where the grass is at a higher level than the surface upon which the lawn mower travels and where an ordinary lawn mower can not be used except in such a position that the one end is at a higher level than the other end so that even cutting of the grass is impossible. With this and other objects in view my invention is embodied in a lawn mower as hereinafter described and as illustrated in the accompanying drawing in which—

Figure 1:
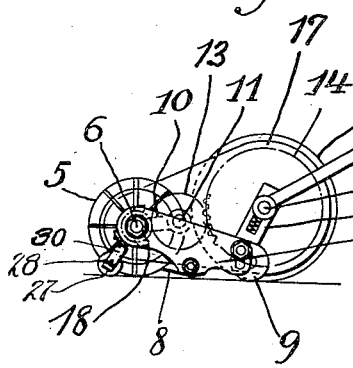
Figure 1 is a side view of my improved lawn mower, parts being broken away.
Figure 2:
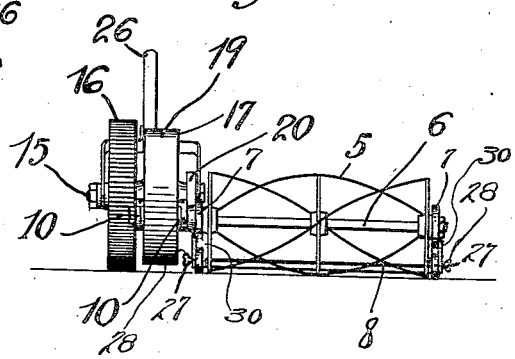
Fig. 2 is a front view of the lawn mower.
Figure 3:
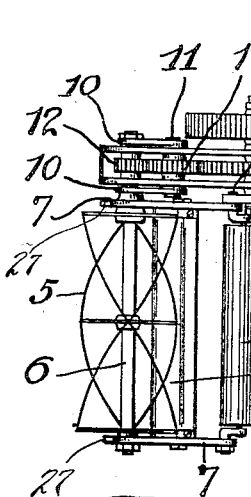
Fig. 3 is a plan view partly in section.
Figure 4:
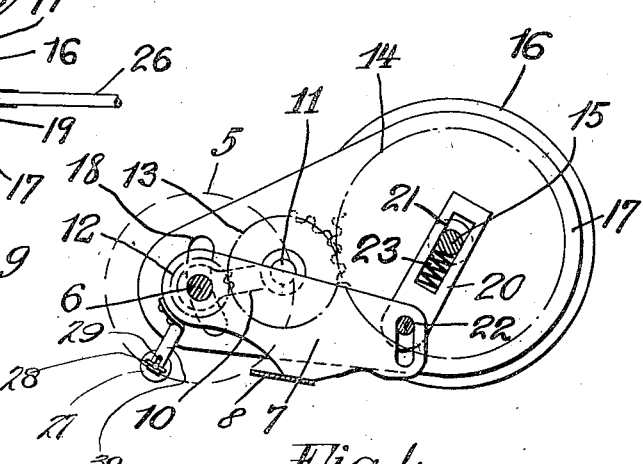
Fig. 4 is a sectional view showing certain important details and features of construction.

The lawn mower is of the type in which the cutting element is located to one side of the driving wheel and framework. In the drawing the numeral 5 denotes the cutting element mounted upon the cutter shaft 6. From the latter are suspended two side frames 7, 7 between which the fixed knife 8 and the usual supporting roller 9 are mounted. In front the cutter element is supported on the small rollers 27, 27 adjustably secured in slots 29 in the brackets 30 by wing nuts 28.

The cutter shaft 6 is carried by two swinging arms 10, 10 which are pivoted on the shaft 11. The latter is fixed in the side frames 17, 17 and the said swinging arms are located on the outside of said frames 17, 17 which are provided with arcuate slots 18 through which the said cutter shaft 6 extends. Thus, the cutting element comprising the parts 5, 6, 7, 8 and 9 is free to move with respect to the frames 17 by a swinging movement in the arms 10 around the fixed pivot 11.

In addition, the rear portion of the cutting element is movably secured to the frames 17 by a link 20 pivoted on a fixed shaft 15 in said frames by means of a slot 21. A spring 23 is interposed between the link 20 and the shaft 15 and the lower end of the link is pivoted to the frame 7 on the bolt 22 of roller 9 aforesaid.

The driving means for the cutter shaft are mounted between the frames 17 and may be inclosed by a casing indicated at 19. Said driving means comprises a pinion 12 fast on the cutter shaft 6 and which meshes with a gear 13 on fixed shaft 11. Gear 13 is in turn driven by the large gear 14 on the fixed shaft 15. Upon the latter the main driving wheel 16 is mounted. 26 is an operating handle.

During operation when the mower is pushed in a forward direction, the cutter is rotated in the usual manner through the instrumentality of the gears 12, 13 and 14, the latter being driven from the wheel 16.

If now an edging or grass border is to be cut which is at a different level than that upon which the wheel 16 runs, the mower is run over the part to be cut and the entire cutting element comprising the parts 5 to 9 as aforesaid will automatically adjust itself to the different level of the sward by being raised or lowered by a swinging movement of the arms 10 in which the cutting element is suspended and without disturbing the driving connection.

If the sward is at a higher level than that upon which the wheel 16 runs, the small wheels 27 will raise the cutter to the proper height over the sward, the shaft 6 will move upward in the slots 18 and the pivot 22 and link 20 will be pulled slightly forward.

If the sward is at a lower level than that upon which the wheel 16 runs, the arms 10 with the cutting element will be correspondingly lowered slightly to the rear, as will also be the case with the pivot 22 and link 21. The spring 23 will, however, at all times tend to press the roller 9 down upon the sward and is chiefly for the purpose of making the cutting element run smooth and steady, and of course also serves as a second supporting means for the cutting element with respect to the frame.

Thus it will be seen that I have provided a lawn mower having a self-adjusting cutter element which automatically adjusts itself to the difference in heights between the grass to be cut and the surface upon which the driving wheel travels.

I claim.

In a lawn mower, the combination of a framework, a shaft pivoted on said framework to move in a slot therein, a cutting element on said shaft, a cutting frame on the latter, a pivoted connection between said cutting frame and said main frame, means in said connection for exerting a steady downward pressure on said cutting frame, driving means for said shaft and means for operating said driving means.

Signed at Morristown, in the county of Morris and State of New Jersey, April, A. D. 1917.

FRODE HENRIKSEN.